United States Patent Office 2,695,031
Patented Nov. 23, 1954

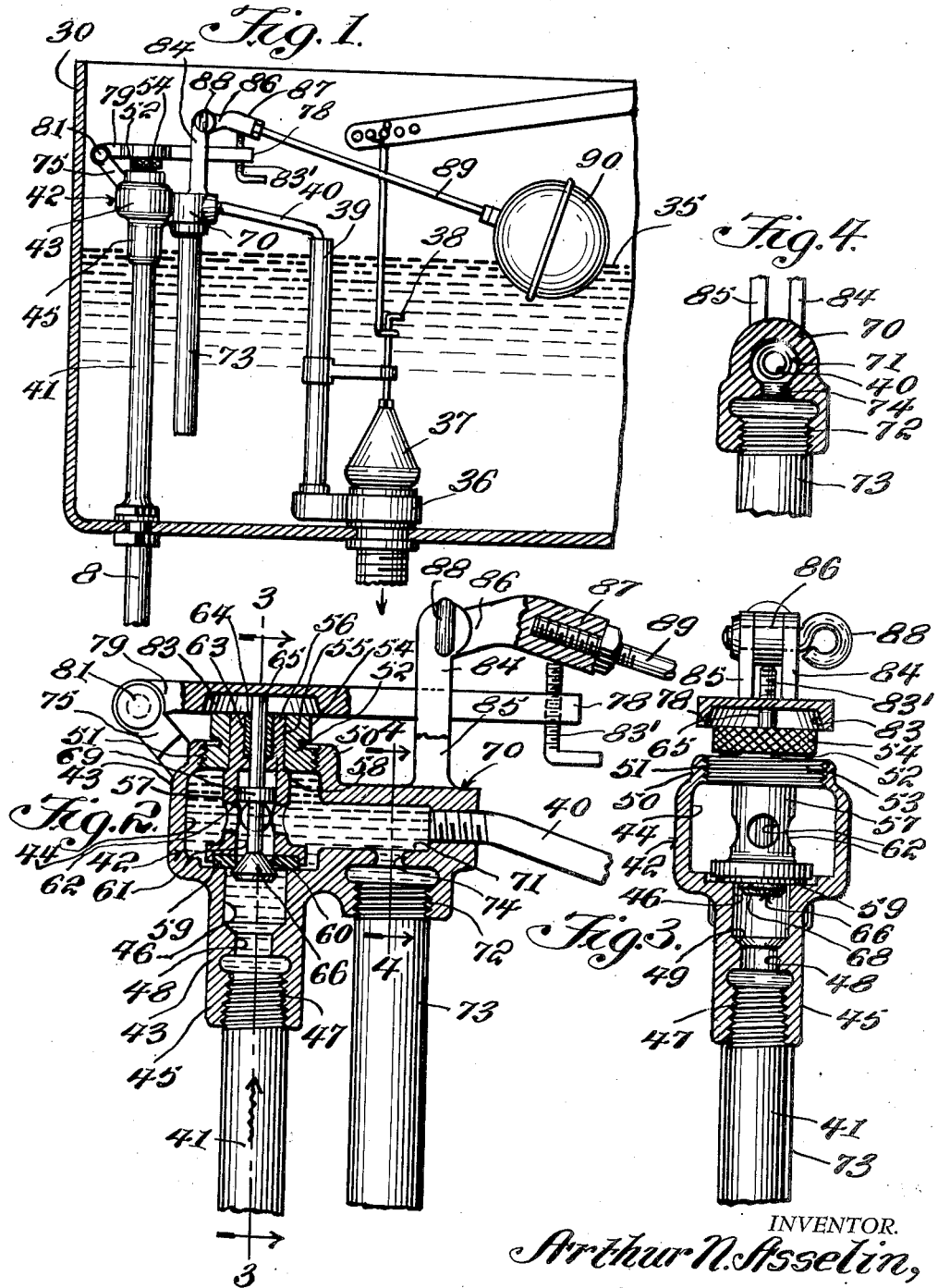

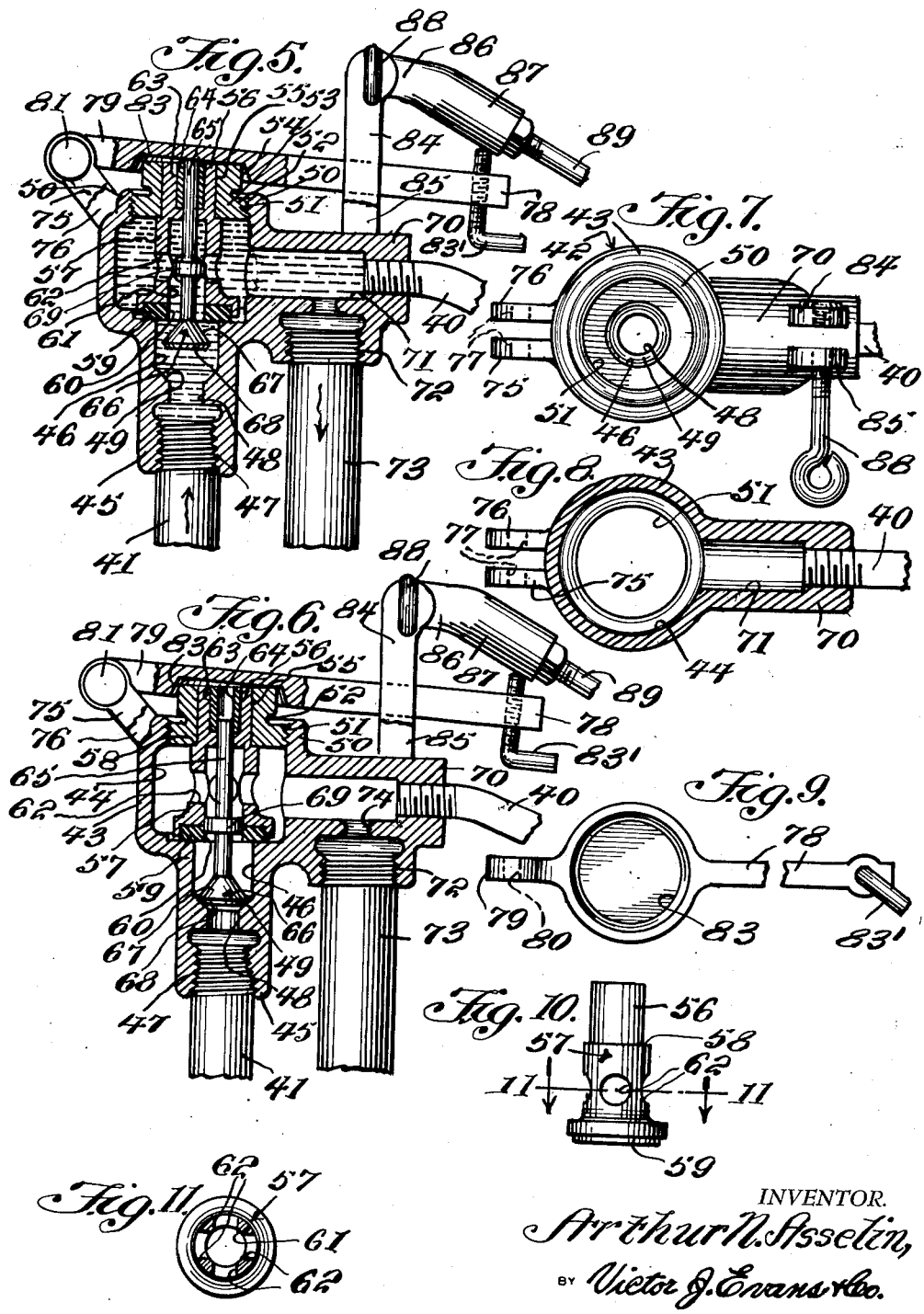

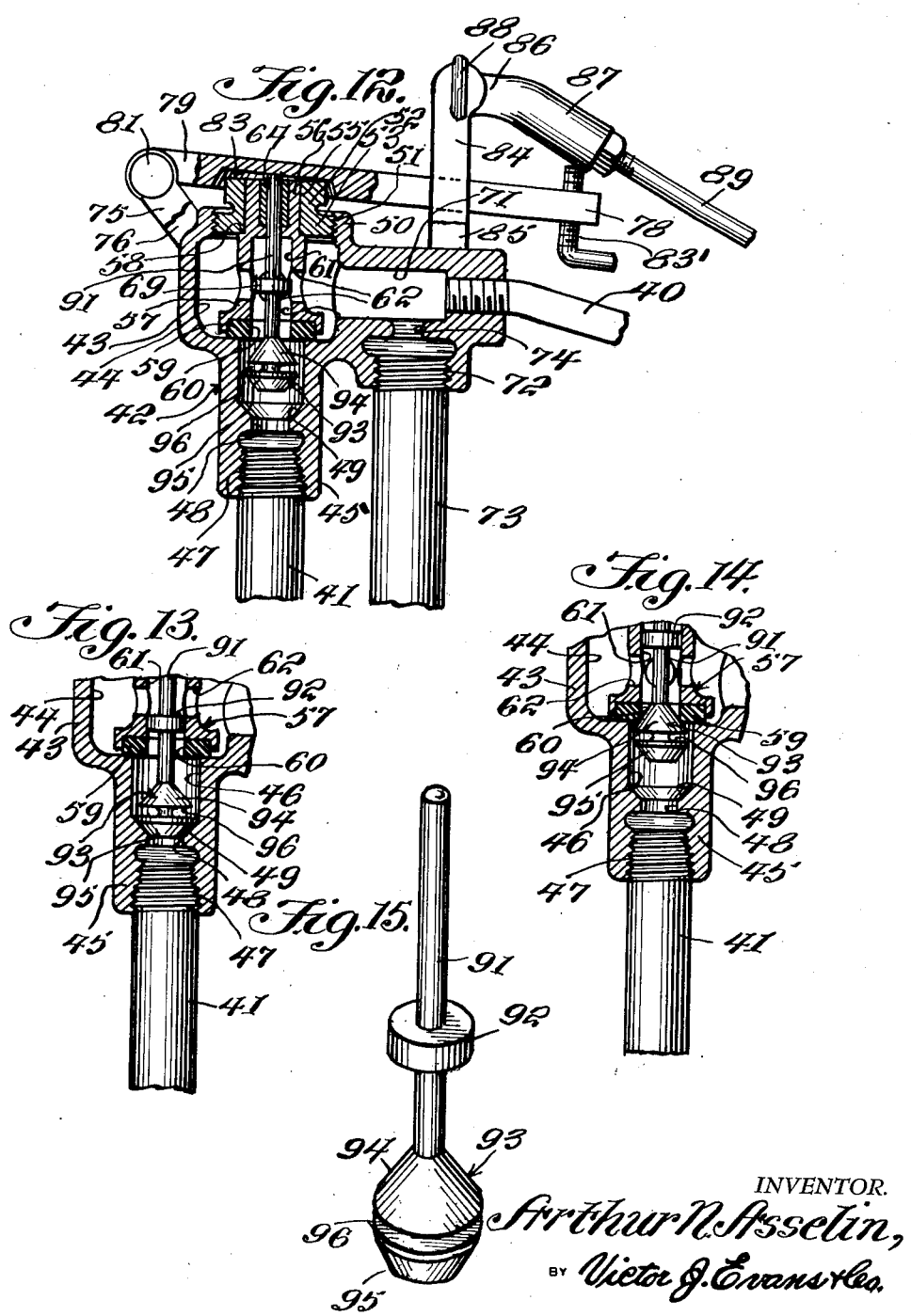

2,695,031

VALVE

Arthur N. Asselin, Fall River, Mass.

Application June 7, 1949, Serial No. 97,518

1 Claim. (Cl. 137—444)

This invention relates to a valve, and more particularly to a valve for use in flush tanks of water closets and the like.

The object of the invention is to provide a valve which is adapted to be normally closed by the pressure of the water entering the tank.

Another object of the invention is to provide a valve mechanism for a toilet storage tank, the valve mechanism being closed by the pressure of the incoming water and wherein a float serves to open the valve to permit water to flow into the storage tank when the float lowers due to the outflow of water from the tank.

Still another object of the invention is to provide a quick acting valve whose parts will not easily deteriorate or get out of order, and wherein the valve can be readily assembled and disassembled.

A further object of the invention is to provide a valve for a toilet storage tank, the valve being simple and inexpensive to manufacture.

Other objects and advantages will be apparent during the course of the following description.

In the accompanying drawings, forming a part of this application, and in which like numerals are used to designate like parts throughout the same:

Figure 1 is a cross sectional view of a toilet tank showing the valve mechanism of the present invention installed therein;

Figure 2 is an enlarged fragmentary view, partly in side elevation and partly in vertical section of the inlet valve in closed position;

Figure 3 is an enlarged sectional view taken on the line 3—3 of Figure 2;

Figure 4 is an enlarged sectional view taken on the line 4—4 of Figure 2;

Figure 5 is a view similar to Figure 2, but showing the valve open;

Figure 6 is a view similar to Figure 2, but showing the closed position of the valve when the water supply is turned off;

Figure 7 is a top plan view of the valve casing, with the cap and cage removed therefrom;

Figure 8 is a horizontal transverse sectional view looking up through the valve casing, with the cage and cap removed;

Figure 9 is a bottom plan view of the actuating arm;

Figure 10 is a side elevational view of the cage;

Figure 11 is a sectional view taken on the line 11—11 of Figure 10;

Figure 12 is an enlarged fragmentary view, partly in side elevation, and partly in vertical mid section, of the valve in open position and provided with a modified piston;

Figure 13 is a fragmentary sectional view of the assembly of Figure 12, with the valve in closed position as when the water supply is turned off;

Figure 14 is a view similar to Figure 13, but showing the valve closed by the pressure of the incoming water; and Figure 15 is an enlarged perspective view of the modified piston for use in the assembly of Figures 12 through 14.

Referring in detail to Figures 1 through 11 of the drawings, the numeral 30 designates a toilet tank containing a body of water 35 which is discharged through the fixture 36 when the valve 37 is operated by means of a conventional trip lever through the medium of the lift 38 in the well known manner. An overflow pipe 39 connects with the fixture 36 at a lower level than the seat of the valve 37 and into the mouth of the overflow pipe 39 is directed the free end of the refill tube 40, the mouth of said tube being located above the highest level of the body of water in the tank 30. A vertically disposed supply pipe 41 is arranged in the tank 30 and a conduit 8, Figure 1, connects the pipe 41 to a suitable source of water under pressure.

The present invention is directed to an inlet valve structure for selectively controlling the flow of water into the tank 30. The inlet valve structure is designated by the numeral 42 and comprises a valve casing 43 which is provided with a chamber or compartment 44 therein. Formed integral with the casing 43 and dependingly carried by the bottom thereof is a sleeve like body member 45 which is provided with a channelway or passageway 46 therein for the passage therethrough of water from the supply pipe 41 to the chamber 44. The lower end of the body member 45 is provided with an interiorly threaded socket 47 for threadably receiving the upper end of the pipe 41. The channelway 46 is of a reduced diameter as at 48 and therefore the water that comes from the supply 41 passes through the reduced portion 48 and thereby undergoes a reduction in pressure. The interior wall of the body member 45 is cut away to define an inclined valve seat 49 for a purpose to be later described.

Projecting upwardly from the top of the casing 43 is a shoulder 50 which is provided with an interiorly threaded opening 51 therein. A plug 52 is provided with an exteriorly threaded skirt 53 which is adapted to be arranged in threaded engagement with the opening 51. A substantial portion of the plug 52 is knurled exteriorly as at 54 to facilitate the manual removal or replacement of the plug 52 in the opening 51.

The plug 52 is provided with a central opening 55 therein and projecting through the opening 55 is the cylindrical end 56 of a cage 57. The end 56 is of a smaller diameter than the lower portion of the cage 57 so that a shoulder 58 is defined in the exterior wall of the cage 57. This shoulder 58 is engaged by the lower surface of the plug 52 whereby the cage 57 is maintained in its proper position in the chamber 44 of the valve casing 43. The cage 57 carries a washer 59 in its lower end and the washer 59 is provided with a central opening 60 therein. The opening 60 in the washer 59 registers with a bore 61 which extends longitudinally through the cage 57 for a major portion of its length. A plurality of spaced openings or apertures are arranged in spaced relation in the side wall of the cage 57, the openings being designated by the numeral 62 and these openings are for the egress therethrough of water. The upper end of the cage 57 is cut away as at 63, and seated in the cutaway portion 63 is a bushing 64. A rod 65 extends longitudinally through the cage 57 and the upper end of the rod 65 at times projects above the plug 52.

Secured to the lower end of the rod 65 is a piston or plunger 66 which is provided with a tapered or inclined upper surface 67 and a lower tapered or inclined surface 68. Arranged transversely with respect to the rod 65 and secured thereto is a disc 69 which slidably moves in the bore 61, the disc 69 serving to help prevent any water from being siphoned back into the source of water supply when the water pressure is turned off, as later described in this application.

Formed integral with one side of the valve casing 43 or secured thereto, is a second body member 70 which is provided with a channelway or passageway 71 therein and the passageway 71 communicates with the chamber 44 for receiving water from the latter. The body member 70 is provided with an interiorly threaded socket 72 whereby a vertically disposed hush tube 73 can be connected thereto. The body member 70 is provided with a small opening 74 which connects the passageway 71 to the pipe or tube 73 whereby water that enters the hush tube 73 will undergo a further reduction in pressure. The end of the refill tube 40 is also threaded into the body member 70 and the refill tube 40 communicates with the passageway 71 and is adapted to receive water from the latter.

A means is provided for moving the piston 66 in order to refill the tank 30 with water when the level of the body of water 35 falls below a predetermined level. Thus, projecting upwardly from one side of the valve casing 43 and secured thereto is a pair of spaced parallel ears 75 and 76 which are each provided with an aperture 77 therein. Arranged above the valve casing 43 is an arm 78 which is provided with a lug 79 that is interposed between the ears 75 and 76. The lug 79 is provided with an aperture 80 which registers with the aperture 77 in the ears 75 and 76 and a rivet 81 projects through these registering apertures whereby a pivotal connection is provided between the arm 78 and the valve casing 43. The arm 78 is provided with a central recess 83 in its lower surface and this recess is of a slightly larger diameter than the top of the plug 52. Adjustably carried by the other end of the arm 78 is a screw 83' which is adapted to be adjusted in order to vary the interval between lowering the level of the body of water 35 and the opening of the inlet valve 42.

Projecting upwardly from the other end of the valve casing 43 and secured thereto is a pair of spaced parallel ears 84 and 85 which have interposed therebetween the flat end 86 of a collar 87. A screw eye 88 projects through the ear 85, through the flat end 86, and through the other ear 84 to thereby provide a pivotal connection between the collar 87 and the valve casing 43. Arranged in threaded engagement with the collar 87 or secured thereto, is a stem or rod 89 which has mounted on its free end a float member 90 of the usual construction. Thus, as the body of water 35 falls below a predetermined level, the float 90 will likewise drop therewith and the collar 87 will contact the upper end of the screw 83' to thereby cause clockwise pivotal movement of the arm 78 so that the rod 65 will be moved downwardly whereupon the piston 66 will move from the position of Figure 2 to the position of Figure 5, whereby additional water will flow into the tank 30 to replenish the water therein.

Referring to Figures 12 through 15, there is shown a modified piston which serves to prevent water hammer or water knock when the pressure in the supply line is exceedingly high. The construction of the assembly of Figures 12 through 15 is the same as the previously described structure of Figures 1 through 11, except that there is provided a piston rod 91 having a disc 92 arranged intermediate its ends and secured to the latter. Secured to the lower end of the rod 91 is a piston plunger 93 which includes an upper tapered portion 94 and a lower inclined or tapered portion 95, there being a cutout 96 arranged intermediate the portions 94 and 95.

The operation of the valve is as follows:

The toilet tank 30 is flushed in the well known manner, at which time the float 90 drops as the body of water 35 is emptied through the discharge fitting 36. As the float 90 starts to fall, the inlet valve structure 42 is immediately opened and water from the supply pipe 41 starts flowing into the tank 30. Normally the parts of the valve structure are in the position shown in Figure 2 or 14. In the device of Figures 1 through 11, the pressure of the water in the supply line 41 forces the plunger 66 upwardly so that the tapered portion 67 of the plunger 66 bridges or closes the opening 60 in the washer 59 so that no water will flow through the valve structure. Now, when the float 90 moves or pivots downwardly as the result of the outflow of water through the fitting 36, the collar 87 will contact or engage the upper end of the screw 83' and this will result in a clockwise pivotal movement of the arm 78 about the rivet 81. This in turn causes the lower surface of the arm 78 to contact the upper end of the rod 65 and cause the rod 65 to slide or move downwardly in the cage 57 whereupon the piston 66 will move from the position of Figure 2 to the position shown in Figure 5. With the piston in the position shown in Figure 5 or 12, water flows from the supply pipe 41 through the passageway 46, then through the opening 60 in the washer 59, then through the bore 61 in the cage 57, then through the openings 62 in the cage 57 and into the chamber or compartment 44. This water then flows from the chamber 44 through the small port or opening 74 through the hush tube 73 and into the tank 30. Also, while the piston 66 is in this position, water flows from the passageway 71 through the refill tube 40 and into the pipe 39. As soon as the body of water 35 reaches a sufficient level in the tank 30, the float 90 will move upwardly thereby moving the collar 87 to an out of the way position with respect to the screw 83'. Then, the pressure of the water from the supply pipe 41 will immediately force the upper surface 67 of the plunger 66 to the position shown in Figure 2, whereby further flow of water through the inlet valve structure will be prevented.

Referring to Figure 6 or 13, the plunger or piston is shown in the position it assumes in the event that water in the supply pipe is cut off. By the construction of this valve, it is impossible for any fluid or material to be siphoned back from the tank 30 or toilet bowl into the supply pipe 41. This anti-siphoning action is insured by means of the lower tapered surface 68 of the plunger 66 or the lower surface 95 of the plunger 93. These tapered surfaces move into seating or closing relation with respect to the valve seat 49 as shown in Figures 6 and 13, when the water supply is turned off. Further, the disc 69 of the valve of Figures 1 through 11, or the disc 92 of Figures 12 through 15 also help to prevent any material from being siphoned back into the supply line 41 in the event that the water supply is turned off. Thus, with the piston in the position shown in Figure 6, the disc 69 moves downwardly in the cage 57 so that it will be impossible for any water to pass from the chamber 44 through the openings 62 and into the passageway 46.

From the foregoing, it is apparent that a valve has been provided which closes as the result of pressure of the incoming water, and this valve therefore operates in the opposite manner from the conventional valve which depends on a buoyant float to close such valve. The float 90 merely serves as a weight for the purpose of opening the valve when it is necessary to refill the tank 30. By the arrangement of the rod 89, collar 87, screw 83', and arm 78, the opening power of the float 90 is greatly increased. Further, the screw 83' can be manually adjusted in order to vary the interval between movement of the float 90 and movement of the piston 66. Only a small portion of the washer 59 is exposed to water so that deterioration thereof is at a minimum and the washer 59 can be readily removed and replaced by first removing the screw eye 88 so that the collar 87 can be disengaged from the ears 84 and 85. Then, the arm 78 can be pivoted out of the way and the plug 52 can be unscrewed from the opening 51 whereupon the cage 57 can be removed from the chamber 44 and the washer 59 can be removed and replaced. The refill tube 40 also serves to prevent any fluid from being resiphoned back into the supply line 41. The float 90 need not be made of expensive material, since as long as it floats it will suffice. As soon as the tank 30 has been filled with water of a sufficient quantity, the float 90 will rise or move in a counterclockwise direction so that the pressure of the incoming water will cause the piston 66 to assume the position shown in Figure 2, whereby further supply of water to the tank 30 will be immediately prevented.

The cutout or groove 96 in the piston 93 serves to eliminate vibrating noises since the groove 96 acts as a stabilizer when the valve is used in high pressure systems. Also, the washer 59 will last indefinitely since the upper movement of the valve stem is limited by contact with the member 78 so that very little pressure will be exerted on the washer by the piston 66. The valve can be readily disassembled using only an ordinary pair of pliers.

What I claim:

A valve mechanism comprising a valve casing provided with a chamber, a first body member formed integrally with said casing and dependingly carried by the bottom thereof, there being a passageway extending through said body member for the passage therethrough of water from the supply pipe, a second body member projecting from one side of said casing, there being a passageway in said second body member communicating with said chamber for the egress therethrough of water, there being an opening in the top of said casing, a plug closing the opening in the top of said casing, there being an aperture in said plug, a cage seated in said chamber and having a portion projecting through the aperture in said plug, there being a bore in said cage, said cage being provided with a plurality of openings for the discharge therethrough of water into said chamber, a piston mounted for movement into and out of closing relation with respect to a supply pipe and the bore in said cage, and a rod connected to said piston slidably arranged in said cage and having an end adapted to project above said plug.

(References on following page)

References Cited in the file of this patent

UNITED STATES PATENTS

| Number | Name | Date |
|---|---|---|
| 846,598 | McKaig | Mar. 12, 1907 |
| 1,265,670 | Kaier | May 7, 1918 |
| 1,389,907 | Sherwood | Sept. 6, 1921 |
| 1,505,278 | Mueller | Aug. 19, 1924 |
| 1,612,350 | Berry | Dec. 28, 1926 |
| 1,618,331 | Gilchrist | Feb. 22, 1927 |
| 1,842,825 | Cunningham | Jan. 26, 1932 |
| 1,903,816 | Hanson | Apr. 18, 1933 |
| 1,979,611 | Forbes | Nov. 6, 1934 |
| 2,014,748 | Schulte | Sept. 17, 1935 |
| 2,206,996 | Asselin | July 9, 1940 |
| 2,308,347 | Asselin | Jan. 12, 1943 |
| 2,371,830 | Langdon | Mar. 20, 1945 |
| 2,390,134 | Svirsky | Dec. 4, 1945 |
| 2,446,549 | Norman | Aug. 10, 1948 |
| 2,571,206 | Couture | Oct. 16, 1951 |